3,290,160
METHOD OF IN SITU FABRICATION OF A MONOLITH REFRACTORY LINING OR THE LIKE
Thomas William Smoot, Bethel Park, Pa., and Maurice D. Cook, Richmond, Va., assignors to Harbison-Walker Refractories Company, Pittsburgh, Pa., a corporation of Pennsylvania
No Drawing. Filed Sept. 3, 1963, Ser. No. 306,293
8 Claims. (Cl. 106—38.5)

The present invention relates to improved methods of in situ fabrication of monolithic refractory linings in metallurgical furnaces, vessels, and similar high temperature environments requiring the use of high temperature construction material. More particularly, the invention relates to improved methods of gunning refractories.

Monolithic or monolith forming refractories are special mixes or blends of dry granular or stiffly plastic refractory materials with which virtually joint free linings are formed. They embrace a wide range of mineral compositions, and vary greatly in their physical and chemical properties. In various types of furnaces monolithic refractories are used to advantage over brick construction. By their use, front installation can be made, avoiding delays for the manufacturer of special brick shapes. They frequently eliminate difficult brick-laying tasks which may be accompanied by weakness in construction. They are of major importance in the maintenance of furnaces; substantial repairs can be made with a minimum loss of time and in some instances even during operations.

Gun mixes consist of granular refractory materials specifically prepared for application with air placement guns. Generally, there are two types of gunning mixes based on their industrial uses; namely (1) those of high density and strength characterized by resistance to heat, chemical attack and mechanical abuse and (2) those of lower density and strength designed primarily for insulating purposes. The mixes are sprayed from the guns, or "gunned," at high velocity and pressure, forming homogeneous and densely compacted linings essentially free from lamination cracks.

Basically there are two types of air placement guns, the dry and the wet. With the dry gun, the dry mix becomes uniformly moistened with water while it is passing through the nozzle during the gunning operation. For use with the wet gun, the material is mixed with water within the chamber of the gun before it is fed to the nozzle. Gun mixes are generally furnished in dry form. Some have air setting properties; others are heat setting.

One of the most serious problems in gunning a refractory is the high losses due to refractory material bouncing back off a wall or the site upon which it is being emplaced. This loss is termed "rebound" in the art. Rebound loss has been as high as 50 and 60%.

Another problem occasioned in gunning is that quite often the refractory material forcefully impacted on its situs of use, owing to the breakdown of individual particles, has properties different than a cast or pressed material of the same chemical composition, which is undesirable.

Accordingly, it is an object of the present invention to provide improved methods of in situ fabrication of monolith refractory linings by gunning.

Another object of the invention is to provide improved methods for gunning refractory material with a relatively low rebound loss.

Still another object of the invention is to provide improved methods of gunning refractory materials wherein the beneficial characteristics of the material is substantially similar to materials of the same chemical composition emplaced by other methods.

In accordance with the present invention and in attainment of the foregoing objects there is provided a method of gunning a refractory material on its situs of use, with a minimum of rebound, to form a refractory monolith. Suitable size graded, refractory material of a metal oxide type is prepared and to this refractory is added a small amount of about from 0.2 to 5% by weight of a cellulosic pellicle of a particular type, which is intimately admixed therewith. The term "cellulosic pellicle" as is used herein includes any fluid absorbent, burnable, moldable organic material, such as, for example, shredded paper or any paper-like or cloth-like material having the above characteristics. The maximum size of the pellicles is the diameter of the orifice of the nozzle being employed.

If the refractory is of the finely divided air setting type, the refractory and cellulosic pellicle mixture is further mixed with an aqueous carrier fluid, such as water, to obtain a free flowing mixture which is easily pumped through the emplacement or gunning apparatus. In the case of coarser size grade refractory, the pellicles and the refractory aggregate are pneumatically conveyed through the gunning apparatus and, immediately before discharge at the nozzle, are intimately admixed with the aqueous carrier fluid. The former and latter techniques just referred to are known in the art as "wet gun" and "dry gun" respectively. In either technique the amount of carrier fluid in the mix at the point of emplacement should be at least 2%. The small addition of cellulosic pellicles to the refractory gunning mix has been found to reduce rebound losses as much as 50% and in some cases the actual bound losses are less than 1% by weight.

The cellulosic pellicles may be mixed with a suitably size graded metal oxide refractory material with the beneficial results stated. Particularly good results have been obtained when the cellulosic pellicles were added, within the limits described, to refractory materials known in the art as "castables," materials containing as major components, refractory aggregate bonded with hydraulic setting binders, such as, refractory cement. The gunned castable mixes with pellicle additions were discovered to have properties of density, strength, and modulus of rupture closely similar to preformed bricks of the same chemical composition. Also, when the material gunned was of an insulating variety, the pellicle addition was found to enhance the insulating properties of the material.

After the resulting slurry is forcefully impacted on the situs of use, the refractory wall may be subjected to elevated temperatures to burn out the cellulosic pellicles and subsequently to sinter the refractory aggregate. In this regard, it is preferable that the chemical components of the cellulosic pellicles be chemically inert with respect to the refractory material. Preferably, the pellicles should be ash free upon combustion.

The following examples are illustrative of the present invention. All parts and percentages are by weight. A majority of the material in each batch was sized and passed through a −4 mesh screen (Tyler standard sieve series). About 60 parts of the −4 mesh material was +65 mesh and about 40 parts −65 mesh.

*Example I*

Three batches of a high-alumina refractory mixture were prepared and size graded. The mixture contained as major components, based on an oxide analysis, approximately 35% $SiO_2$, 56% $Al_2O_3$, and 5.4% $CaO$ with small amounts of titania, iron oxide, magnesia and alkalies. To two of the batches were added 1% shredded paper (¼″ maximum linear dimension) and 1% asbestos longs (at least 2 inches in length) respectively. The paper, asbestos, and unaltered mixtures were mixed with the following approximate percentages of water respectively to obtain proper gunning consistency: 14%, 11%, and 12%. Each of the resultant slurries were gunned upon a wall construction at approximately 20 lbs. per sq. in. of pressure. After gunning, the rebounds from each mix were accumulated and analyzed. The results indicated that the paper mix had a rebound loss of 13% as compared with 30% for the nonadditive mix and 20% for the asbestos mix.

*Example II*

Two batches of a lightweight high-alumina refractory mixture were prepared and size graded. The mixture contained as major components approximately 42.3% $SiO_2$, 47.6% $Al_2O_3$, and 4.8% $CaO$ based on an oxide analysis. 1% of shredded paper and approximately 16% of water were added to one batch, and 15% of water was added to the other batch. The resultant slurries were gunned as in Example I. The rebounds from each gun mix were accumulated and calculated. The paper mix was found to have a rebound loss of leess than 1% while the nonadditive mix had a rebound loss of 12.7%.

*Example III*

Three batches of a lightweight catable refractory mixture were prepared and size graded. The mixture contained as major components based on an oxide analysis, about 46.4% $SiO_2$, 26.9% $Al_2O_3$, and 11% $CaO$. To one batch was added 1% shredded paper and approximately 24% water. To another batch was added 2% paper and about 25% water. The third batch was mixed with about 14% water and no paper. Each of the resultant slurries was gunned as in Example I. The results indicated that the batch without paper had a rebound loss of 39%; the batch with 1% paper, a rebound loss of 22%; and, the batch with 2% paper, a rebound loss of 18%.

Each of the above examples conclusively shows that the addition of cellulosic pellicles of paper and a suitable amount of water to refractory aggregate markedly decreases the rebound losses.

*Example IV*

Two batches of a castable refractory mixture were prepared and size graded containing as major components, based on an oxide analysis, about 36.9% $SiO_2$, 36.5% $Al_2O_3$, and 17% $CaO$. One of the batches was mixed with 1% shredded paper and about 28.2% water. This batch was then gunned on a wall as in Example I. It has a rebound loss of less than 1%. The emplacement was then dried at 230° F. The other batch was cast into a brick shape. Test samples of the gunned emplacement were removed from the wall and the gunned samples and cast brick were tested on a comparative basis. The results indicated that the gunned aggregate had a density of 57 p.c.f., a modulus of rupture of 160 p.s.i., and a cold crushing strength of 460 p.s.i. The cast brick had a density of 59 p.c.f., a modulus of rupture of 180 p.s.i., and a cold crushing strength of 500 p.s.i.

*Example V*

A lightweight insulating mixture was prepared as in Example IV in three batches containing as major components, based on the oxide analysis, about 46.4% $SiO_2$, 26.9% $Al_2O_3$, and 11% $CaO$. Two of the batches were mixed with about 20% water and one of these two batches was mixed with 1% shredded paper. Both batches were gunned on a simulated furnace wall and it was found that the paper batch had a rebound loss of about 35% and a thermal conductivity of 2.4 as compared to a 70% loss and a thermal conductivity of 3.5 for the mixture without the paper addition. The third batch was cast into a brick shape. A sample of the paper mix was then removed from the wall and this sample and the cast brick were tested on a comparative basis. The test results indicated that the gunned paper mix had a density of 94 p.c.f., a modulus of rupture of 660 p.s.i., and a cold crushing strength of 1720 p.s.i. The cast brick had a density of 90 p.c.f., and modulus of rupture of 550 p.s.i., and a cold crushing strength of 1600 p.s.i.

The results above again show that the addition of cellusosic pellicles of paper to refractory aggregate that is gunned on its situs of use, materially reduces the rebound loss as compared to a gunned aggregate without the paper addition. Further, Example IV and V clearly indicate that the gunned aggregate with a paper addition does not detract from the beneficial characteristics of the refractory aggregate in the cast condition. As is indicated in Example V, the addition of the pellicles to the gun mix enhanced the insulating properties.

*Example VI*

Any of the mixtures of Examples I to V may be used in other grinds in which the size grading is finer (for wet gun application) to provide an overall grind of about 90% −65 +325 mesh. Carrier fluid amounts to about 10% by weight for the "wet gun."

The foregoing oxide analyses reported in the examples may be obtained by mixing suitable proportions of two or more materials; such as, calcined clays, fire clay, ball clay, kyanite, expanded obsidian, dust collector fines, and calcium aluminate cement. For instance, in Example I, calcined flint clay was admixed with calcium aluminate cement. In Example II, calcined clay was mixed with crude kyanite, expanded obsidian, ball clay, and calcium aluminate cement. In Examples III and V, expanded fire clay was mixed with calcium aluminate cement. In Example IV, calcined dust collector fines was mixed with expanded obsidian and calcium aluminate cement. However, it should be understood that other suitable raw materials may be employed also with equally good results.

While the invention has been described with reference to specific embodiments, it should be appreciated that various modifications, substitutions, and the like may be made herein without departing from its scope.

We claim:

1. In a method of gunning refractory material on its situs of use to form a refractory monolith, which method include the steps of preparing a refractory batch and tempering it, the improvement consisting essentially of mixing from 0.2 to 5 parts, by weight, of burnable, water absorbent, shredded, cellulose pellicle with each about 100 parts, by weight, of the refractory batch, and gunning the resulting batch.

2. The method of claim 1 in which the refractory material contains as major components based on an oxide analysis, $SiO_2$, $Al_2O_3$, and $CaO$.

3. The method of claim 1 wherein the maximum linear dimension of particles of said shredded cellulose pellicle is smaller than about ¼".

4. A method of preparing a batch of metal oxide refractory gunning mix for use in forming a refractory monolith on its situs of use, comprising adding to metal oxide refractory material from 0.2 to 5 parts, by weight, of water-absorbent, shredded paper material to each about 100 parts, by weight, of the refractory material, the chemical components of the paper material being chemically inert with respect to the refractory material, mixing the refractory material and paper material with sufficient water as to allow gunning.

5. A method of gunning refractory material on its situs of use, with a minimum of rebound, to form a refractory monolith, comprising adding to metal oxide refractory material from 0.2 to 5 parts, by weight, of water-absorbent, shredded, cellulose material to each about 100 parts by weight, of the refractory material, the chemical components of the cellulose material being chemically inert with respect to the refractory material, mixing the refractory material and cellulose material with sufficient aqueous tempering agent to allow gunning, and gunning the resulting mixture on the situs of use.

6. The method of claim 5 in which the shredded cellulose material is cloth.

7. A refractory monolith forming material consisting essentially of metal oxide refractory material and burnable, shredded cellulose material, in the weight ratio of from 0.2 to 5 parts, by weight, of the shredded cellulose material for each 100 parts, by weight of the refractory material, all particles of the cellulose material being smaller than about ¼ maximum linear dimension.

8. A method of gunning refractory material on its situs of use, with a minimum of rebound, to form a refractory monolith, comprising adding to metal oxide refractory material from 0.2 to 5 parts, by weight, of water-absorbent shredded paper material to each about 100 parts, by weight, of the refractory material, the chemical components of the paper material being chemically inert with respect to the refractory material, mixing the refractory material and paper material with sufficient water to allow gunning, and gunning the resulting mixture on the situs of use.

References Cited by the Examiner
UNITED STATES PATENTS

| | | | |
|---|---|---|---|
| 1,377,510 | 5/1921 | Novotny | 117—5.1 |
| 1,775,576 | 9/1930 | Waters | 117—5.1 |
| 2,183,424 | 12/1939 | Clark | 117—5.1 |
| 2,343,842 | 3/1944 | Hatcher | 117—5.3 XR |

ALEXANDER H. BRODMERKEL, *Primary Examiner.*

MORRIS LIEBMAN, *Examiner.*

J. B. EVANS, *Assistant Examiner.*